(12) United States Patent
Jia et al.

(10) Patent No.: US 11,645,900 B1
(45) Date of Patent: May 9, 2023

(54) EARLY WARNING METHOD FOR ICEFALL-CAUSED MORAINE LAKE OUTBURST DISASTERS

(71) Applicants: Institute of Mountain Hazards and Environment, CAS, Chengdu (CN); Sichuan Highway Planning, Survey, Design and Research Institute Ltd, Chengdu (CN)

(72) Inventors: Yang Jia, Chengdu (CN); Shengfu Li, Chengdu (CN); Yonggang Ge, Chengdu (CN); Qiang Yu, Chengdu (CN); Changfeng Liu, Chengdu (CN); Huayong Chen, Chengdu (CN); Dong Wang, Chengdu (CN); Yu Lei, Chengdu (CN); Lu Sun, Chengdu (CN); Peng Li, Chengdu (CN); Huilong Pu, Chengdu (CN); Yixin Wang, Chengdu (CN); Junwen Peng, Chengdu (CN)

(73) Assignees: Institute of Mountain Hazards and Environment, CAS, Chengdu (CN); Sichuan Highway Planning, Survey, Design and Research Institute Ltd, Chengdu (CN)

( * ) Notice: Subject to any disclaimer, the term of this patent is extended or adjusted under 35 U.S.C. 154(b) by 0 days.

(21) Appl. No.: 18/077,590

(22) Filed: Dec. 8, 2022

(51) Int. Cl.
*G08B 21/10* (2006.01)
*G01W 1/10* (2006.01)

(52) U.S. Cl.
CPC ............... *G08B 21/10* (2013.01); *G01W 1/10* (2013.01)

(58) Field of Classification Search
CPC ................................. G08B 21/10; G01W 1/10
See application file for complete search history.

(56) References Cited

FOREIGN PATENT DOCUMENTS

| CN | 102831752 A | 12/2012 |
|---|---|---|
| CN | 105513285 A | 4/2016 |
| CN | 105740616 A | 7/2016 |
| CN | 107564245 A | 1/2018 |
| CN | 113065706 A | 7/2021 |

*Primary Examiner* — Curtis B Odom
(74) *Attorney, Agent, or Firm* — Yanjun Ma; DeWitt LLP

(57) ABSTRACT

The present disclosure relates to the field of early warning for geological disasters, and discloses an early warning method for icefall-caused moraine lake outburst disasters, which aims at solving the problems of low early warning precision and difficulty in implementation in an early warning solution of the prior art. The method includes: S1, calculating topographic parameters of moraine lakes and upstream glaciers thereof, and filtering a moraine lake to undertake focal monitoring; S2, calculating a freezing-thawing cycle index and a regional accumulated temperature index of an upstream glacier region for the moraine lake to undertake focal monitoring, S3, calculating a catastrophic climate determination factor $T_{G\text{-}year}$, wherein if the catastrophic climate determination factor $T_{G\text{-}year}$ satisfies a corresponding catastrophic climate determination condition, an early warning condition is satisfied, otherwise the early warning condition is not satisfied; and S4, implementing early warning.

14 Claims, 2 Drawing Sheets

EARLY WARNING METHOD FOR ICEFALL-CAUSED MORAINE LAKE OUTBURST DISASTERS

CROSS REFERENCE TO RELATED APPLICATION

This patent application claims the benefit and priority of Chinese Patent Application No. 202210281461.5 filed with the China National Intellectual Property Administration on Mar. 22, 2022, the disclosure of which is incorporated by reference herein in its entirety as part of the present application.

TECHNICAL FIELD

The present disclosure relates to the field of early warning for geological disasters, and particularly to an early warning method for icefall-caused moraine lake outburst disasters.

BACKGROUND

Moraine lake outburst disasters are one of the special geological disasters in high altitude mountain areas. Secondary disasters such as catastrophic flood and debris flow caused by moraine lake outburst disasters pose a serious threat to the economic development and security for the local population in those high-altitude mountain areas. The formation of moraine lake outburst disasters in high and cold mountain areas is different from that of dammed lake outburst in general mountain areas. Apart from topographic factors, the stability of a dam body may also be affected by dam structure damage caused by ice melting inside the dam body, and the sudden ice avalanches, landslides and intensified glacial ablation in the upstream glaciers of the moraine lake. In particular, ice avalanches may lead to the abnormal water level rises of the lake and the overtopping scour of the dam, resulting in serious erosion damage, which further causes burst and flood discharge of the moraine lake. Icefall-caused moraine lake burst is one of the most common types of moraine lake outburst disasters.

At present, the methods for determining a moraine lake outburst disaster mainly include the following.

1. Only topographic or meteorological factor is used as the main determination factors of moraine lake outburst disasters. Such method has low accuracy, and cannot accurately determine the occurrence time of the disaster, and cannot effectively support decision-making and disposal after the occurrence of a moraine lake outburst disaster, as disclosed in:

Chinese Patent Application with an application number "2012103388325", entitled "EARLY WARNING METHOD FOR MORAINE LAKE OUTBURST DISASTERS";

Chinese Patent Application with an application number "2016100610961", entitled "METHOD FOR DETERMINING RISKS OF MORAINE LAKE OUTBURST DISASTERS"; and Chinese Patent Application with an application number "202110372810X", entitled "METHOD FOR PREDICTING MORAINE LAKE OUTBURST DISASTERS BASED ON GEOLOGICAL DETECTOR AND SUPPORT VECTOR MACHINE.

2. Early warning for moraine lake outburst disasters is implemented by taking into full consideration the climate and topographic factors. Such methods often use accumulated temperature change or short-duration temperature change as the main meteorological determination condition, which cannot objectively reflect the climatic mechanism of a moraine lake near to occurrence of glaciers collapse. Besides, such methods use a fixed early warning threshold, which does not accord with the actually dynamic changes in critical conditions of disasters in complex natural environment, causing a limited range of application in the early warning for moraine lake outburst disasters. Such methods are disclosed in, e.g., Chinese Patent Application with an application number "2017108974922", entitled "FORECASTING METHOD FOR MORAINE LAKE OUTBURST DISASTERS CONSIDERING RAINFALL"; and Chinese Patent Application with application number "2016100585989", entitled "EARLY WARNING METHOD FOR MORAINE LAKE OUTBURST DISASTERS.

SUMMARY

An objective of the present disclosure is to construct, in view of the technical status of early warning for moraine lake outburst flood, an early warning method for icefall-caused moraine lake outburst disasters, which is specific to early warning for icefall-caused moraine lake outburst disasters in cold highland areas, and is high in early warning precision and easy to implement.

The technical solutions adopted by the present disclosure to solve the above technical problems are as follows:

The present disclosure provides an early warning method for icefall-caused moraine lake outburst disasters, including the following steps:

S1, calculating, based on surveying and mapping data, topographic parameters of moraine lakes and upstream glaciers thereof, calculating a dangerous topography determination factor R of each moraine lake according to the obtained topographic parameters, and filtering a moraine lake to undertake focal monitoring according to the dangerous topography determination factor R;

S2, calculating climate parameters of an upstream glacier region for the moraine lake to undertake focal monitoring, where the climate parameters include a freezing-thawing cycle index $\beta$ and a regional accumulated temperature index $\alpha$ of the upstream glacier region;

S3, based on the climate parameters calculated in step S2, calculating a catastrophic climate determination factor $T_{G\text{-}year}$, and performing determination using a climate determination model oriented towards icefall-caused moraine lake outburst, where if the catastrophic climate determination factor $T_{G\text{-}year}$ satisfies a corresponding catastrophic climate determination condition, an early warning condition is satisfied, otherwise the early warning condition is not satisfied; and S4, implementing early warning.

Further, said calculating, based on surveying and mapping data, topographic parameters of a moraine lake and upstream glaciers, calculating a dangerous topography determination factor R of the corresponding moraine lake according to the obtained topographic parameters, and selecting a moraine lake to undertake focal monitoring according to the dangerous topography determination factor R in step S1 specifically includes:

S11, according to the surveying and mapping data, obtaining a volume $V_L$ of each moraine lake, a height $h_b$, a width $w_b$ and a downstream slope $S_b$ of a dam of the moraine lake, and a volume $V_g$ of dangerous ice and a glacier tongue slope $S_G$ of an upstream glacier tongue of the moraine lake, where the surveying and mapping data include an optical remote sensing image and a digital elevation model;

S12, based on topographic data obtained in step S11, calculating the topographic parameters, where the topographic parameters include a height-width ratio y and a downstream slope factor $G_b$ of the damof the moraine lake, as well as a dangerous ice index I and a glacier tongue slope factor $G_G$ of the upstream glacier tongue;

where the height-width ratio of the moraine lake's dam is $\gamma=h_b/w_b$; the downstream slope factor $G_b$ of the dam is obtained by dimensionless processing on the downstream slope $S_b$; the glacier tongue slope factor $G_G$ is obtained by dimensionless processing on the glacier tongue slope $S_G$; and the dangerous ice index $I=V_g/V_L$, wherein $V_g$ denotes the volume of dangerous ice, and $V_L$ denotes the volume of the moraine lake;

S13, calculating, based on the topographic parameters obtained in step S12, the dangerous topography determination factor R:

$$R=k_1G_G+k_2I+k_3G_b+k_4\gamma$$

where $k_1$, $k_2$, $k_3$ and $k_4$ are weight coefficients; and

S14, determining the moraine lake with the dangerous topography determination factor R greater than a predetermined threshold as the moraine lake to undertake focal monitoring.

Specifically, step S11 includes performing interpretation based on the optical remote sensing image to calculate an area $A_g$ of dangerous ice in the upstream glacier tongue, and extracting a slope $S_g$ of dangerous ice in the upstream glacier tongue by using the digital elevation model; and calculating, by following formula, the volume $V_g$ of dangerous ice based on the obtained area $A_g$ of dangerous ice and the slope $S_g$ of dangerous ice:

$$V_g = A_g \times \frac{\tau_0}{k\rho g \sin S_g}$$

where $\tau_0$ denotes an ice yield stress, k denotes a block calculation coefficient, $\rho$ denotes an ice density, and g denotes a gravitational acceleration.

Specifically, step S11 further includes performing interpretation based on the optical remote sensing image to calculate a lake area $A_L$ of the moraine lake; and obtaining a water depth $D_L$ based on an empirical formula regarding a water depth $D_L$ of a region where the moraine lake is located, and the lake area $A_L$; and calculating the volume $V_L$ of the moraine lake according to a following volume formula of the moraine lake: $V_L=A_L \times D_L$.

Specifically, step S13 includes calculating the weight coefficients $k_1$, $k_2$, $k_3$ and $k_4$ by using an analytic hierarchy process, which is expressed as follows:

$$k_i = \frac{1}{n} \times \sum_{j=1}^{n} \frac{a_{ij}}{\sum_{q=1}^{m} a_{qj}}$$

where $k_i$ denotes a weight coefficient, n denotes a number of rows of a judgment matrix, m denotes a number of columns of the judgment matrix, $a_{ij}$ denotes comparison on importance of an ith influence factor and a jth influence factor, and $a_{qj}$ denotes comparison on the importance of a qth influence factor and the jth influence factor.

Further, said calculating climate parameters of an upstream glacier region of the moraine lake to undertake focal monitoring in step S2 specifically includes:

S21, performing regional temperature interpolation on the upstream glacier region;

S22, performing local temperature correction based on regional temperature interpolation and temperature observation data at monitoring sites; and S23, calculating a freezing-thawing cycle index $\beta$ and a regional accumulated temperature index $\alpha$ in the upstream glacier region during a time interval from a starting day of an adjacent winter half year to a day on which monitoring is performed.

Specifically, said performing regional temperature interpolation on the upstream glacier region in step S21 specifically includes:

performing, by Thin Plate Spline (TPS), regional temperature interpolation on the upstream glacier region based on daily temperature observation data at a meteorological station of the moraine lake and topographic data of upstream glaciers of the moraine lake:

$$T_i f(x_i)+b^T y_i+e_i$$

where $T_i$ denotes a temperature interpolation result of a grid i in the upstream glacier region, $f(x_i)$ denotes an estimated temperature of a grid $x_i$, b denotes a coefficient of terrain covariate, $y_i$ denotes an elevation value of the grid $x_i$, and $e_i$ denotes a random error.

Specifically, said performing local temperature correction based on regional temperature interpolation and temperature observation data at monitoring sites in step S22 includes:

S221, obtaining daily temperature observation data $t_i$ of each the monitoring site by using temperature monitoring equipment installed at each monitoring site in the upstream glacier region, and calculating a difference between the daily temperature observation data and the temperature interpolation result $T_i$ of the grid $x_i$ to which the monitoring site belongs so as to obtain a single-site temperature correction value $R_{Ti}$ of temperature interpolation and observation value;

S222, constructing a Thiessen polygon based on the temperature correction value Rn of each monitoring site in the upstream glacier region, and performing spatial interpolation to generate local temperature correction data $R_T$;

S223, calculating local temperature optimization data TR by adding the regional temperature interpolation result and local temperature correction data RT with their resolutions being unified.

Further, said performing determination using a climate determination model oriented towards icefall-caused moraine lake outburst in step S3 specifically includes:

S31, based on a disaster history sample, calculating a freezing-thawing cycle index $\beta$ and a regional accumulated temperature index $\alpha$ of a year in which a disaster occurs, and an adjacent year adjacent to the year and without disaster occurrence, where a starting day of a winter half year adjacent to a day on which a disaster occurs is deemed as an initial day, a time interval of the adjacent year refers to a period from an initial day of a current calendar year to an initial day of a previous calendar year, and a time interval of the year in which a disaster occurs refers to a period from the initial day to the day on which a disaster occurs;

S32, constructing a two-dimensional space of the freezing-thawing cycle index $\beta$ and regional accumulated temperature index $\alpha$, projecting data of the year in which a disaster occurs and the adjacent year adjacent to the year and without disaster occurrence to the two-dimensional space, performing regression analysis and setting a catastrophic climate threshold $T_{y\text{-}threshold}$; and S33, based on the freezing-thawing cycle index $\beta$ and the regional accumulated temperature index $\alpha$ obtained in step S2, calculating the catastrophic climate determination factor $T_{G\text{-}year}$; based on the catastrophic climate threshold $T_{y\text{-}threshold}$ obtained in step S32, determining a relationship between the catastrophic climate determination factor $T_{G\text{-}year}$ and the catastrophic climate threshold $T_{y\text{-}threshold}$; and if $T_{G\text{-}year} > T_{y\text{-}threshold}$, determining that climate conditions for icefall-caused moraine lake outburst are met.

Specifically, the regression analysis in step S32 is to solve an optimal segmentation hyperplane of the two-dimensional space;

in step S33, based on the freezing-thawing cycle index $\mu$ and the regional accumulated temperature index $\alpha$ in the upstream glacier region, the catastrophic climate determination factor $T_{G\text{-}year}$ is calculated according to the following formula:

$$T_{G\text{-}year} = k_5 \beta + k_6 a$$

where $k_5$ and $k_6$ denote fitting coefficients of an optimal segmentation curve in the two-dimensional space constructed by the freezing-thawing cycle index $\beta$ and regional accumulated temperature index $\alpha$; and the catastrophic climate threshold $T_{y\text{-}threshold}$ is set as follows according to a maximum geometric margin of the two-dimensional space:

$$T_{y\text{-}threshold} = -\frac{b}{w}$$

where w and b are parameters of a minimum vector distance segmentation surface between samples with disaster occurrence and samples without disaster occurrence in the two-dimensional space.

Specifically, the freeze-thaw cycle index $\beta$ is calculated according to the following formula:

$$\beta = M_t / M_{average}$$

where $M_t$ denotes a number of freezing-thawing cycles in the current year of the initial day, $M_{average}$ denotes an average number of freezing-thawing cycles in the n years before the current year of the initial day, and n is an integer greater than 1; the time interval for the current year of the initial day denotes a period from the initial day to the starting day of the winter half year adjacent to the initial day, and the time interval of the previous year denotes a period from the starting day of the winter half year adjacent to the initial day to the same starting day of the winter half year of the previous calendar year, and so on; and the number of freezing-thawing cycles is counted as follows: if a daily maximum temperature is greater than 0 and a daily minimum temperature is less than 0, 1 is added to the number of freezing-thawing cycles.

Specifically, the regional accumulated temperature index $\alpha$ is calculated according to following formula:

$$\alpha = \log_D^{\frac{AT}{k}}$$

where AT denotes an effective accumulated temperature in the neighboring upstream glacier region, which is obtained by accumulating daily temperatures within a specified time interval, where when temperature AT is positive, accumulating is performed, otherwise accumulating stops; D denotes a number of days with positive temperatures, accumulated within the specified time interval; and k denotes a regression fitting coefficient.

Further, step S4 includes:

S41, based on historical sample databases with or without disaster occurrence, calculating a dangerous topography determination factor R and a catastrophic climate determination factor $T_{G\text{-}year}$ of each sample, and projecting data of all samples to the two-dimensional space for regression analysis;

S42, based on the dangerous topography determination factor R obtained in step S1 and the catastrophic climate determination factor $T_{G\text{-}year}$ obtained in step S3 for a target moraine lake, determining a probability that a disaster occurs in the target moraine lake according to an analysis result obtained in step S41, and establishing early warning levels according to the disaster probability; and S43, implementing early warning corresponding to one of the early warning levels of the target moraine lake.

Specifically, regarding the historical sample database with disaster occurrence, samples are acquired from data of a moraine lake where a disaster has occurred, and a time interval of the sample data is from a day on which a disaster occurs to the starting day of the winter half year adjacent to the day on which a disaster occurs; and regarding the historical sample database without disaster occurrence, samples are acquired from data of adjacent year without disaster occurrence in the moraine lake where a disaster has occurred in history and the data of adjacent and disaster-free moraine lakes within the same period; where the time interval of the adjacent year is a period from the initial day of the current calendar year to the initial day of the previous calendar year, and the initial day is the starting day of the winter half year adjacent to the day on which a disaster occurs; and the same period means the time interval from the day on which a disaster occurs to the starting day of the winter half year adjacent to the day on which a disaster occurs.

Specifically, step S41 includes constructing, according to following formula, an outburst risk probability segmentation index model for regression analysis:

$$CR = T_{G\text{-}year} - \omega \times n(R)$$

where $T_{G\text{-}year}$ denotes a catastrophic climate determination factor, R denotes a dangerous topography determination factor, and $\omega$ denotes a fitting parameter of an index segmentation curve in a two-dimensional space; and step S42 specifically includes calculating CR based on the dangerous topography determination factor R obtained in step 51 and the catastrophic climate determination factor $T_{G\text{-}year}$ obtained in step S3 for the target moraine lake; and determining early warning level of the target moraine lake according to the range within which CR falls.

Specifically, said implementing early warning in step S41 includes:

S411, normalizing a dangerous topography determination factor $R_i$ and a catastrophic climate determination factor $T_{G\text{-}year}$ of each sample, obtaining projection weights $\varphi_i$ and $\lambda_i$ respectively, calculating a sum $(\varphi_i + \lambda_i)$ of the projection weights, and sorting all weight sums by size, where i denotes a sample serial number;

S412, performing probabilistic segmentation on sorted weight sums $(\varphi_i \lambda_i)$ into n probability intervals according to the probabilities of disaster occurrence, where a segmented probability is denoted as $P_m$, and samples falling in each probability interval constitute a probability interval sample set $S_n$, and the subscripts m and n represent a serial number, with m≥1 and n=m+1; and the probability of disaster occurrence represents a proportion of the number of samples with disaster occurrence to the total number of samples in the probability interval sample set $S_n$;

S413, extracting, from adjacent probability interval sample sets, partial samples with ($\varphi_i+\lambda_i$) ranking at the bottom in the probability interval sample set with a high probability of disaster occurrence and partial samples with ($\varphi_i+\lambda_i$) ranking at the top in the probability interval sample set with a low probability of disaster occurrence, to construct a segmented sample dataset $D_m$ of a segmented probability $P_m$ corresponding to the adjacent probability interval sample sets, where the partial samples are samples of a specified number or proportion;

S414, based on the segmented sample dataset $D_m$, calculating corresponding optimal segmentation $CR_m$ and $\omega_m$ by following objective function:

$$\min_{CR,\omega} \sum_{i=1}^{N} (y_i - (CR + \omega^T X))^2$$

where $y_i$ denotes $T_{G\text{-}year_i}$ of an ith sample in the probability interval sample $D_m$, X denotes an $\ln(R_i)$ matrix of each sample in the probability interval sample $D_m$, and N denotes a number of samples in the probability interval sample $D_m$; and S415, establishing the early warning levels according to calculated $CR_1$, $CR_2$, . . . , $CR_m$, where the segmented probability increases as the level increases.

The present disclosure has the following beneficial effects:

Based on the historical sample data, the present disclosure makes full use of the dam's width-height ratio, dangerous ice index, mother glacier slope and other parameters which can reflect the dam stability and glacier state of a moraine lake. Besides, on the basis of high-precision interpolation and optimization calculation of the temperature data in the glacier region of the moraine lake, a highly reliable and easy-to-implement early warning method for icefall-caused moraine lake outburst disasters in cold highland areas is developed after dangerous topography screening, catastrophic climate determination and comprehensive condition probability multi-level analysis. multi-parameters of hundreds of moraine lakes in cold highland areas are calculated in real time, and the calculation object is more targeted by the hierarchical condition screening, which makes the method suitable for rapid early warning of large-scale moraine lake outburst disasters in cold hi land areas.

BRIEF DESCRIPTION OF THE DRAWINGS

FIGS. 1A and 1B are a flowchart of an early warning method for icefall-caused moraine lake outburst disasters according to the present disclosure, in which FIG. 1A illustrates a calculation module for topographic parameters of glaciers in a moraine lake and a calculation module for climate parameters in glacier region near the moraine lake; and FIG. 1B illustrates early warning analysis and calculation module based on samples of moraine lake outburst disasters.

DETAILED DESCRIPTION OF THE EMBODIMENTS

Figure 1A:
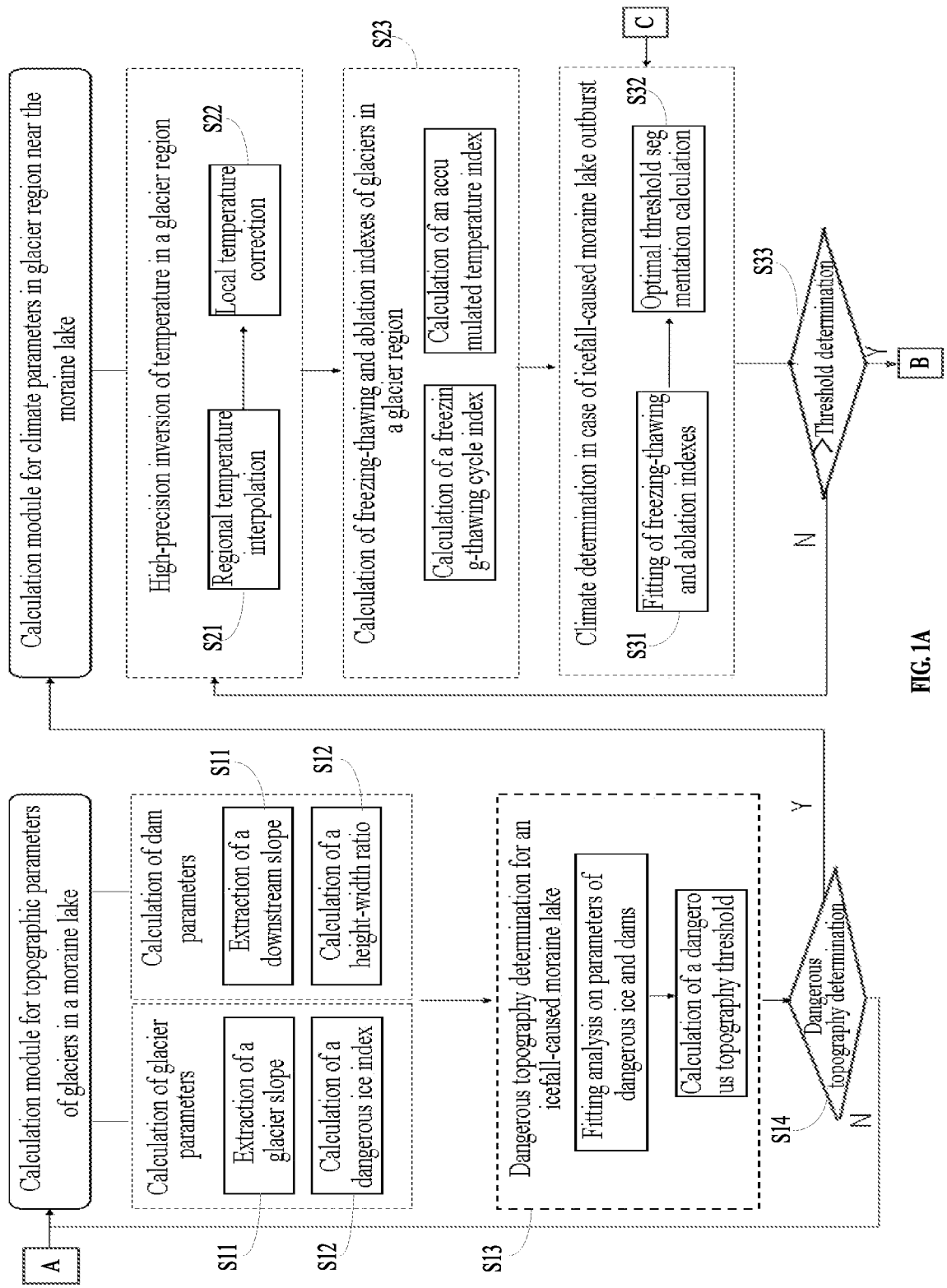
Figure 1B:
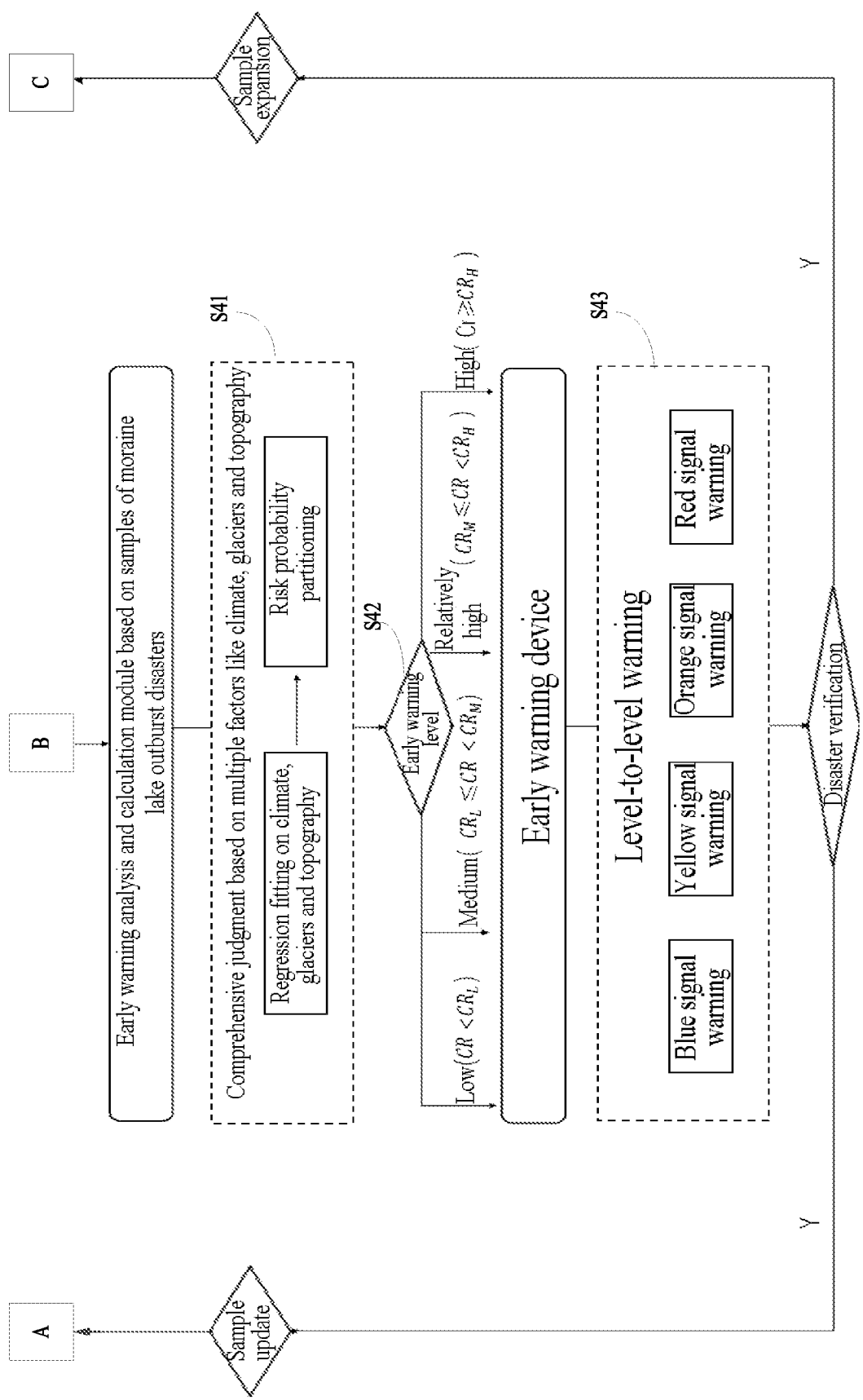

The present disclosure provides an early warning method for icefall-caused moraine lake outburst disasters, which aims at solving the problems of low early warning precision and difficulty in implementation in an early warning solution of the prior art. As shown in FIG. 1, the method includes: S1, calculation of topographic parameters of glaciers in a moraine lake: calculating topographic parameters of upstream glaciers and dams of the moraine lake, and filtering a moraine lake to be monitored mainly, by a dangerous ice and topography regression determination model oriented towards icefall-caused moraine lake outburst; S2, calculation of climate parameters of an upstream glacier region of the moraine lake: according to the temperature data of the upstream glacier region of the moraine lake to be monitored mainly, calculating a freezing-thawing cycle index and a regional accumulated temperature index of glaciers; S3, early warning analysis for moraine lake outburst: with icefall-caused moraine lake outburst that has occurred as sample data, performing regression fitting on climate data and topographic data of glaciers in the moraine lake to obtain a climate determination model oriented towards icefall-caused moraine lake outburst, and based on calculated climate parameters of the glacier region, determining catastrophic climate; and S4, performing early warning. After the occurrence of a disaster is determined, the state data of a single disaster event is added to the early warning analysis for moraine lake outburst in S3, so as to enlarge calculation and analysis samples for next event.

Upstream glaciers of the moraine lake are determined with the watershed $H_{watershed}$ of a basin of the moraine lake as a boundary and an altitude $H_{moraine\ lake}$ of the moraine lake as a lowest elevation point, and meanwhile meet the following three conditions: 1, the glacier region is located within the watershed of the basin to which the moraine lake belongs; 2, $H_{moraine\ lake}$<elevation of the glacier region<$H_{watershed}$; and 3, a distance between the nearest point of the glacier region relative to the moraine lake and the moraine lake should be less than 200 m, and the average slope should not be less than 5°.

Embodiment

An embodiment provides an early warning method for icefall-caused moraine lake outburst disasters, including the following implementation steps S1 to S4.

In step S1, based on surveying and mapping data, topographic parameters of a moraine lake and upstream glaciers thereof are calculated, a dangerous topography determination factor R of the corresponding moraine lake is calculated according to the obtained topographic parameters, and a moraine lake to be monitored mainly is filtered according to the dangerous topography determination factor R, which specifically includes steps S11 to S19.

In step S11, the high-resolution optical remote sensing image with a resolution greater than 1 m is interpreted to calculate a lake area AL of a moraine lake and an area Ag of dangerous ice in an upstream glacier tongue, where the dangerous ice refers to the ice which exists above ice tongues or an ice lake basin, has a high crevasse development, and is prone to outburst or slippage. Such dangerous ice is often found below a grade change point at the end of the glacier tongue or in areas where crevasses are dense.

In step S12, a glacier tongue slope $S_G$, a slope $S_g$ of dangerous ice, and a height $h_b$, a width $w_b$ and a downstream slope $S_b$ of a moraine lake's dam are extracted by using a digital elevation model with a precision higher than 1:50,000.

In step S13, based on the area $A_g$ of dangerous ice obtained in step S11 and the slope $_g$ of dangerous ice in the glacier tongue obtained in step S12, the volume $V_g$ of dangerous ice are calculated by the following formula:

$$V_g = A_g \times \frac{\tau_0}{k\rho g \sin S_g},$$

where To denotes an ice yield stress, which is related to the scale of dangerous ice, and $\tau_0$ is usually set to 100-150 kPa; k denotes a block calculation coefficient and is usually set to 0.50-0.90; $\rho$ denotes an ice density; and g denotes a gravitational acceleration.

In step S14, the volume $V_L$ of the moraine lake can be obtained according to the actual surveying and mapping data. However, in this embodiment, in order to facilitate implementation, based on the lake area $A_L$ of the moraine lake obtained in step S11, and according to the empirical formula regarding the lake area $A_L$ and a water depth $D_L$ of a region where the moraine lake is located, the water depth $D_L$ is obtained; and a volume $V_L$ of the moraine lake is calculated according to a following volume formula of the moraine lake: $V_L = A_L \times D_L$.

By way of example, a moraine lake in the cold highland area of Tibet has a following empirical formula regarding the relationship between the water depth $D_L$ and lake area $A_L$:

$$D_L = 0.087 A_L^{0.434}.$$

In step S15, based on the volume $V_g$ of dangerous ice obtained in step S13 and the volume $V_L$ of the moraine lake obtained in step S14, a dangerous ice index I is calculated by the following formula:

$$I = V_g/V_L.$$

In step S16, based on the dam's downstream slope Sb obtained in step S12, the dam's downstream slope factor $G_b$ is calculated as follows:

$$G_b = \tan S_b.$$

Based on the glacier tongue slope SG obtained in step S12, the dam's glacier tongue slope factor GG is calculated as follows:

$$G_G = \tan S_G.$$

In step S17, based on the dam's height $h_b$ and width $w_b$ of the moraine lake obtained in step S12, the dam's height-weight ratio $\gamma$ is calculated as follows:

$$\gamma = h_b/w_b.$$

In step S18, based on the glacier's dangerous ice index I, moraine dam's height-width ratio $\gamma$, glacier tongue slope factor $G_G$, and dam's downstream slope factor $G_b$, the dangerous topography determination factor R corresponding to moraine lake is calculated as follows:

$$R = k_1 G_G + k_2 I + k_3 G_b + k_4 \gamma,$$

where $k_1$, $k_2$, $k_3$ and $k_4$ are weight coefficients.

The foregoing weight coefficients $k_1$, $k_2$, $k_3$ and $k_4$ are calculated by using an analytic hierarchy process, which is expressed as follows:

$$k_i = \frac{1}{n} \times \sum_{j=1}^{n} \frac{a_{ij}}{\sum_{q=1}^{m} a_{qj}},$$

where ki denotes a weight coefficient, n denotes a number of rows of a judgment matrix, m denotes a number of columns of the judgment matrix, and n and m are set to be 4 in the embodiment. aij denotes comparison on the importance of an ith influence factor and a jth influence factor, and aqj denotes comparison on the importance of a qth influence factor and the jth influence factor. The importance comparison result is set according to the sample data about disasters that have occurred and the experience of engineering prevention and control.

In this embodiment, $k_1=0.16$, $k_2=0.13$, $k_3=0.48$ and $k_4=0.23$.

In step S19, based on the dangerous topography determination factor R, the dangerous ice and topography regression determination model oriented towards icefall-caused moraine lake outburst is used to filter the moraine lake to be monitored mainly, that is, the moraine lake with the dangerous topography determination factor R greater than a predetermined threshold is determined as the moraine lake to be monitored mainly.

In this embodiment, based on the example of moraine lakes on the Tibetan Plateau, it is determined that: R≥2.5, which indicates that the moraine lake meets the topographic conditions for an outburst disaster; or R<2.5, which indicates that the moraine lake does not meet the topographical conditions for an outburst yet.

In step S2, climate parameters of an upstream glacier region are calculated for the moraine lake to be monitored mainly, filtered in step S1, where the climate parameters include a freezing-thawing cycle index $\beta$ and a regional accumulated temperature index $\alpha$ of the upstream glacier region, which specifically includes steps S21 to S26.

In step S21, based on the daily temperature observation data of the national meteorological station in the region of a moraine lake, and topographic data with a precision higher than 1: 50,000, by Thin Plate Spline (TPS), temperature interpolation is performed on the upstream glacier region of the moraine lake to be monitored mainly with R≥2.5 in step S1, to obtain a regional temperature interpolation result T with a resolution of the target basin greater than 5 m, which can be expressed as:

$$T_i = f(x_i) + b^T y_i + e_i,$$

where $T_i$ denotes a temperature interpolation result of a grid i in the upstream glacier region, $f(x_i)$ denotes an estimated temperature of a grid $x_i$, b denotes a coefficient of terrain covariate, $y_i$ denotes an elevation value of the grid $x_i$, and $e_i$ denotes a random error.

In step S22, the daily temperature observation data ti at a monitoring site $x_i$ is obtained by using more than three temperature monitoring apparatuses installed in the upstream glacier region, and a difference between the daily temperature observation data and the temperature interpolation result $T_i$ of the grid $x_i$ to which the monitoring site in step S21 belongs is calculated so as to obtain a single-site temperature correction value $R_{Ti}$ of temperature interpolation and observation values.

In step S23, a Thiessen polygon is constructed based on the temperature correction value $R_{Ti}$ of each monitoring site in the upstream glacier region, and spatial interpolation is performed to obtain local temperature correction data $R_T$ with a resolution greater than 5 m.

In step S24, local temperature optimization data $T_R$ is calculated by adding the regional temperature interpolation result T obtained in step S21 and local temperature correction data $R_T$ obtained in step S23 with their resolutions being unified.

In step S25, based on the local temperature optimization data $T_R$ obtained in step S24, a freeze-thaw cycle index $\beta$ is calculated as follows:

$$\beta = M_i / M_{average},$$

where $M_i$ denotes a number of freezing-thawing cycles in the current year of the initial day, $M_{average}$ denotes an average number of freezing-thawing cycles in the n years before the current year of the initial day, and n is an integer greater than 1. The time interval for the current year of the initial day denotes a period from the initial day to the starting day of the winter half year adjacent to the initial day, and the time interval of the previous year denotes a period from the starting day of the winter half year adjacent to the initial day to the same starting day of the winter half year of the previous calendar year, and so on. In this step, the initial day is the monitoring day. In this embodiment, n=5.

The process of calculating the number of valid freezing-thawing cycles is as follows: if a daily maximum temperature calculated according to $T_R$ in step S24 is greater than 0, and a daily minimum temperature is less than 0, 1 is added to the number of accumulated freeze-thaw cycles.

In step S26: based on the local temperature optimization data $T_R$ obtained in step S24, and the effective accumulated temperature AT of a glacier region calculated through day-by-day accumulation, the accumulated temperature index $\alpha$ of the glacier region is calculated according to the following formula:

$$\alpha = \log_D^{\frac{AT}{k}},$$

where AT denotes an effective accumulated temperature in the upstream glacier region, which is obtained by accumulating daily temperatures within a specified time interval, where when the temperature AT is positive, accumulating is performed, otherwise accumulating stops; D denotes a number of days with positive temperatures accumulated within the specified time interval; and k denotes a regression fitting coefficient. In this step, the specified time interval is from the starting day of the adjacent winter half year to the monitoring day.

In step S3, based on the climate parameters calculated in step S2, a catastrophic climate determination factor $T_{G-year}$ is calculated, and determination is performed using a climate determination model oriented towards icefall-caused moraine lake outburst, where if the catastrophic climate determination factor $T_{G-year}$ satisfies a corresponding catastrophic climate determination condition, an early warning condition is satisfied, otherwise the early warning condition is not satisfied, which specifically includes the following steps S31 to S33.

In step S31, based on disaster history samples, a freezing-thawing cycle index $\beta$ and a regional accumulated temperature index $\alpha$ of a year in which a disaster occurs, and an adjacent year adjacent to the year and without disaster occurrence are calculated, where a starting day of a winter half year adjacent to a day on which a disaster occurs is taken as an initial day, a time interval of the adjacent year refers to a period from an initial day of a current calendar year to an initial day of a previous calendar year, and a time interval of the year in which a disaster occurs refers to a period from the initial day to the day on which a disaster occurs;

In step S32, a two-dimensional space of the freezing-thawing cycle index $\beta$ and regional accumulated temperature index $\alpha$ are constructed, data of the year in which a disaster occurs, and the adjacent year adjacent to the year and without disaster occurrence are projected to the two-dimensional space, and the optimal segmentation hyperplane of two-dimensional space is calculated by using a support vector machine (SVM), where the formula of the optimal segmentation hyperplane is as follows:

$$w^T x_i + y_i + b = 0,$$

where w and b are optimal segmentation hyperplane coefficients, $x_i$ is an x-axis coordinate set of disaster sample points in the two-dimensional space, and $y_i$ is a y-axis coordinate set of the disaster sample points in the two-dimensional space; and the freezing-thawing cycle index $\beta$ and regional accumulated temperature index $\alpha$ correspond to x and y arbitrarily. In this embodiment, the x-axis indicates the freezing-thawing cycle index $\beta$, and the y-axis indicates the accumulated temperature index $\alpha$.

The minimum vector distance in the above two-dimensional space is solved by the following formula:

$$\min \frac{1}{2} \|w\|^2 \text{ s.t. } y_i(w^T x_i + b) \geq 1.$$

In step S33, based on the freezing-thawing cycle index $\beta$ and the regional accumulated temperature index $\alpha$ obtained in step S2, a catastrophic climate determination factor $T_{G-year}$ is calculate; based on the catastrophic climate threshold $T_{y-threshold}$ obtained in step S32, a relationship between the catastrophic climate determination factor $T_{G-year}$ and the catastrophic climate threshold $T_{y-threshold}$ is determined; and if $T_{G-year} > T_{y-threshold}$, it is determined that climate conditions for icefall-caused moraine lake outburst are met. The step S33 specifically includes the following processes.

Firstly, based on the freezing-thawing cycle index $\beta$ and the regional accumulated temperature index $\alpha$ in the upstream glacier region, the catastrophic climate determination factor $T_{G-year}$ is calculated according to the following formula:

$$T_{G-year} = k_2 \beta k_6 a,$$

where $k_5$ and $k_6$ denote fitting coefficients of an optimal segmentation line in the two-dimensional space constructed by the freezing-thawing cycle index $\beta$ and regional accumulated temperature index $\alpha$.

Secondly, the catastrophic climate threshold $T_{y-threshold}$ is set as follows according to a maximum geometric margin of the two-dimensional space:

$$T_{y-threshold} = -\frac{b}{w},$$

where w and b are parameters of minimum vector distance segmentation surface between samples with disaster occurrence and samples without disaster occurrence in the two-dimensional space.

In step S4, early warning is implemented:

In step S41, based on historical sample databases with or without disaster occurrence, a dangerous topography determination factor R and a catastrophic climate determination factor $T_{G-year}$ of each sample are calculated, and data of all samples are projected to the two-dimensional space for regression analysis.

Regarding the historical sample database with disaster occurrence, its samples relate to data of a moraine lake where a disaster has occurred, and a time interval of the sample data is from a day on which a disaster occurs to the starting day of the winter half year adjacent to the day on which a disaster occurs.

Regarding the historical sample database without disaster occurrence, samples relate to annual data of an adjacent year without disaster occurrence for the moraine lake where a disaster has occurred and the data of adjacent and disaster-free moraine lakes within the same period. Where the time interval of the adjacent year is a period from the initial day of the current calendar year to the initial day of the previous calendar year, and the initial day is the starting day of the winter half year adjacent to the day on which a disaster occurs; and the same period means the time interval from the day on which a disaster occurs to the starting day of the winter half year adjacent to the day on which a disaster occurs.

The adjacent year is a year before a year in which a disaster occurs, and if a disaster also occurs in an immediate previous year, go back further. However, since topography and climate both need to be considered in the samples in this step, it is desirable to select samples falling in an previous year in which no disaster occurs and immediately adjacent to the year in which a disaster occurs. Regarding the adjacent moraine lake, the farther the distance is, the greater the number of samples is, and the larger the difference among samples is. Meanwhile, if the distance is too small, no samples can be found. Therefore, the distance can be set according to the specific conditions of the area where the moraine lake is located, such as less than 10 km.

An outburst risk probability segmentation index model is constructed according to the following formula for regression analysis:

$$CR = T_{G\text{-}year} - \omega \times ln(R),$$

where $T_{G\text{-}year}$ denotes a catastrophic climate determination factor, R denotes a dangerous topography determination factor, and $\omega$ denotes a fitting parameter of an index segmentation curve in a two-dimensional space.

The step S41 specifically includes the following steps S411 to S415.

In step S411, a dangerous topography determination factor $R_i$ and a catastrophic climate determination factor $T_{G\text{-}year_i}$ of each sample are normalized, to obtain projection weights $\varphi_i$ and $\gamma_i$ respectively, various sums $(\varphi_i + \gamma_i)$ of the projection weights are calculated, and sorted by size, where i denotes a sample number; and a formula for normalization processing is as follows:

$$\varphi_i = \frac{R_i}{\sum_{1}^{n} R_j}, \quad \lambda_i = \frac{T_{G\text{-}year_i}}{\sum_{1}^{n} T_{G\text{-}year_j}},$$

where i denotes a serial number of the currently calculated sample, j denotes an jth sample in the total number of samples, and n denotes the number of samples.

In step S412, probabilistic segmentation is performed on weight sums $(\varphi_i + \gamma_i)$ after sorting according to the probability of disaster occurrence, to obtain n probability intervals, Where a segmented probability is denoted as $P_m$, and samples falling within each probability interval constitute a probability interval sample set $S_n$, and the subscripts m and n represent a serial number, with m≥1 and n=m+1; and the probability of disaster occurrence denotes a proportion of the number of samples with disaster occurrence to the total number of samples in the probability interval sample set $S_n$.

In step S413, part of the samples with $(\varphi_i + \gamma_i)$ ranking at the bottom in the probability interval sample set with a high probability of disaster occurrence and part of the samples with $(\varphi_i + \gamma_i)$ ranking at the top in the probability interval sample set with a low probability of disaster occurrence are extracted from adjacent probability interval sample sets to construct a segmented sample dataset $D_m$ of a segmented probability $P_m$ corresponding to the adjacent probability interval sample sets, where the part of samples are samples of a specified number or proportion.

In step S414, based on the segmented sample dataset $D_m$, corresponding optimal segmentation $CR_m$ and $\omega_m$ are calculated by the following objective function:

$$\min_{CR,\omega} \sum_{i=1}^{N} (y_i - (CR + \omega^T X))^2,$$

where $y_i$ denotes $T_{G\text{-}year_i}$ of an ith sample in the probability interval sample $D_m$, X denotes an $ln(R_i)$ matrix of each sample in the probability interval sample $D_m$, and N denotes a number of samples in the probability interval sample $D_m$.

The objective function is intended to calculate optimal CR and $\omega$ when the following expression reaches a minimum value:

$$\text{``} \sum_{i=1}^{N} (y_i - (CR + \omega^T X))^2 \text{''}.$$

The specific formula derivation and calculation process are as follows.

From the formula for regression analysis in step S41:

$$CR = T_{G\text{-}year} - \omega \times ln(R),$$

it is derived that:

$$T_{G\text{-}year} = CR + \omega \times ln(R),$$

where R and $T_{G\text{-}year}$ respectively correspond to the horizontal axis x and vertical axis y of a two-dimensional space for risk probability regression analysis in step S41. Therefore, to solve the least square optimal solution for nonlinear segmentation of the two-dimensional space for risk probability regression analysis in step S41 is to solve:

$$\min_{Y} \sum_{i=1}^{N} (y_i - Y)^2,$$

$$Y = GR + \omega \times ln(x).$$

That is, the following objective function is solved:

$$\min_{CR,\omega} \sum_{i=1}^{N} (y_i - (CR + \omega^T X))^2,$$

to obtain optimal CR and $\omega$.

The process of calculating the optimal solution is as follows:

introducing an unknown coefficient matrix:

$$C = [CR, \omega^T]^T;$$

then, simplifying the objective function as:

$$\min_{CR,\omega}(y - C^T X)^T (y - C^T X),$$

where $$X = \begin{bmatrix} 1 & 1 & 1 \\ \ln(R_1) & \ln(R_2) & \cdots \ln(R_n) \end{bmatrix};$$

calculating the derivative of the unknown coefficient matrix C for the objective function, and setting the result of derivation to 0, to obtain the following:

$$2(-X)(y-C^T X)^T=0;$$

finally, calculating the optimal CR and ω of the unknown coefficient matrix:

$$C=(XX^T)^{-1}Xy^T,$$

where $X=\ln(R_i)$, $Y=T_{G\text{-}year_i}$.

In step S415, early warning levels are established according to calculated $CR_1, CR_2, \ldots, CR_m$, where the higher the corresponding segmented probability is, the higher the level is.

For example, if the early warning is divided into high, relatively high, medium and low levels, the corresponding probability intervals are [50%, 100%], [10%, 50%), [1%, 10%) and [0, 1%), and the corresponding segmentation probabilities are 50%, 10% and 1%, respectively.

Projection weights of all moraine lake samples $\varphi_1, \varphi_2, \varphi_3, \ldots, \varphi_n$ and $\Xi_1, \gamma_2, \gamma_3, \ldots, \gamma_n$ are calculated in sequence, then the weight sums $\varphi_1+\gamma_1, \varphi_2+\gamma_2, \varphi_3+\gamma_3, \ldots, \varphi_n+\gamma_n$ are calculated by adding the projection weights, and the weight sums are sorted in a descending order.

Probability segmentation is performed on sorted weight sums according to a segmentation probability to obtain probability interval sample sets $S_1, S_2, S_3$ and $S_4$ corresponding to the probability intervals [50%, 100%], [10%, 50%), [1%, 10%) and [0, 1%).

Based on the probability interval sample sets $S_1$ and $S_2$ corresponding to probability intervals [50%, 100%] and [10%, 50%), $P_{S_1}$ pieces of sample data with the weight sums ranking at the bottom in $S_1$ are picked out, and $P_{S_2}$ pieces of sample data with the weight sums ranking at the top in $S_2$ are picked out. After combining $P_{S_1}$ pieces of sample data and $P_{S_2}$ pieces of sample data, a segmented sample dataset $D_1$ for probability intervals [50%, 100%] and [10%, 50%) is formed, and $P_{S_1}$ and $P_{S_2}$ account for 20% of the total number of samples within interval sample sets $S_1$ and $S_2$, respectively. Similarly, a segmented sample dataset $D_2$ corresponding to probability intervals of [10%, 50%) and [1%, 10%), and a segmented sample dataset $D_3$ corresponding to probability intervals of [1%, 10%) and [0, 1%) are picked out.

By using the segmented sample dataset corresponding to probability intervals, based on the least square optimization method, the optimal segmentation $CR_H$ and $\omega_H$ corresponding to risk probability of 50%; optimal segmentation $CR_m$ and $\omega_m$ corresponding to risk probability of 10%; and optimal segmentation $CR_L$ and $\omega_L$ corresponding to risk probability of 1% are calculated.

In step S42, based on the dangerous topography determination factor R obtained in step 51 and the catastrophic climate determination factor $T_{G\text{-}year}$ obtained in step S3 for the target moraine lake, a probability that a disaster occurs in the target moraine lake is determined according to an analysis result obtained in step S41, and early warning levels are established according to the disaster probability. The three determination thresholds corresponding to the four risk probability intervals are as follows:

$$CR_H=T_{G\text{-}year}-\omega_H \times ln(R)$$

$$CR_M=T_{G\text{-}year}-\omega_M \times ln(R)$$

$$CR_L=T_{G\text{-}year}-\omega_L \times ln(R),$$

where $CR_H$ is a threshold corresponding to the risk probability of 50%, $CR_m$ is a threshold corresponding to the risk probability of 10%, and $CR_L$ is a threshold corresponding to the risk probability of 1%; $T_{G\text{-}year}$ denotes the catastrophic climate determination factor of the monitored moraine lake, that is, the target moraine lake; and R is the topography determination factor of the target moraine lake; $\omega_H$ is the fitting parameter of a segmentation curve between a high risk interval and a relatively high risk interval; $\omega_m$ is the fitting parameter of a segmentation curve between a relatively high risk interval and a medium risk interval, and $\omega_L$ is the fitting parameter of a segmentation curve between a medium risk interval and a low risk interval.

The early warning level of the target moraine lake is determined according to the interval within which CR falls.

In step S43, early warning corresponding to the early warning level of the target moraine lake is implemented.

For example, there may be four levels of early warning, namely, high, relatively high, medium and low. When the comprehensive score regarding climate and dangerous topography of a monitored moraine lake is $CR \geq CR_H$, a red early warning signal is given; when $CR_m \leq CR < CR_H$, an orange early warning signal is given; when $CR_L \leq CR < CR_m$, a yellow early warning signal is given; and when $CR \leq CR_L$, a blue early warning signal is given.

After early warning for a disaster is implemented and it is verified that a disaster occurs, topographic parameters of glaciers in S1 are updated synchronously according to the changes of topographic conditions of the moraine lake after the outburst. Further, calculation sample data for outburst climate determination in S3 are updated synchronously according to characteristic data about freezing-thawing cycle index and accumulated temperature index on the day of disaster, and the optimal segmentation threshold is recalculated. Furthermore, the new disaster samples will expand the calculation samples in S4, and calculation and update are performed in iterative cycles to obtain optimal segmentation $CR_m$ and $\omega_m$ which satisfy the sample probability intervals, which will be used as the basis and condition parameters for the early warning and calculation of the moraine lake outburst disaster in the next day.

The present disclosure is described in detail with reference to the above embodiments. However, the foregoing embodiments are preferred implementations of the present disclosure, and the implementations are not limited by the above embodiments. It should be understood that a person of ordinary skill in the art may design various modifications and implementations, and these modifications and implementations shall fall within the protection scope and spirit of the present disclosure.

What is claimed is:

1. An early warning method for icefall-caused moraine lake outburst disasters, comprising:
   S1, calculating topographic parameters of moraine lakes and upstream glaciers thereof based on surveying and mapping data, calculating a dangerous topography determination factor R of each moraine lake according to the obtained topographic parameters, and filtering a moraine lake to undertake focal monitoring according to the dangerous topography determination factor R;

S2, calculating climate parameters of an upstream glacier region for the moraine lake to undertake focal monitoring, wherein the climate parameters comprise a freezing-thawing cycle index $\beta$ and a regional accumulated temperature index $\alpha$ of the upstream glacier region;

wherein the freezing-thawing cycle index $\beta$ is calculated according to the following formula:

$$\beta = M_i/M_{average}$$

wherein $M_i$ denotes a number of freezing-thawing cycles in a current year of an initial day, $M_{average}$ denotes an average number of freezing-thawing cycles in the n years before the current year of the initial day, and n is an integer greater than 1; a time interval for the current year of the initial day denotes a period from the initial day to a starting day of a winter half year adjacent to the initial day, and a time interval of a previous year denotes a period from the starting day of the winter half year adjacent to the initial day to the same starting day of the winter half year of the previous calendar year, and so on; and the number of freezing-thawing cycles is counted as follows: if a daily maximum temperature is greater than 0 and a daily minimum temperature is less than 0, 1 is added to the number of freezing-thawing cycles;

wherein the regional accumulated temperature index $\alpha$ is calculated according to following formula:

$$\alpha = \log_D^{\frac{AT}{k}},$$

wherein AT denotes an effective accumulated temperature in the upstream glacier region, which is obtained by accumulating daily temperatures within a specified time interval, wherein when temperature AT is positive, accumulating is performed, otherwise accumulating stops; D denotes a number of days with positive temperatures, accumulated within the specified time interval; and k denotes a regression fitting coefficient;

S3, based on the climate parameters calculated in step S2, calculating a catastrophic climate determination factor $T_{G\text{-}year}$, and performing determination using a climate determination model oriented towards icefall-caused moraine lake outburst, wherein if the catastrophic climate determination factor $T_{G\text{-}year}$ satisfies a corresponding catastrophic climate determination condition, an early warning condition is satisfied, otherwise the early warning condition is not satisfied; and S4, implementing early warning.

2. The early warning method for the icefall-caused moraine lake outburst disasters according to claim 1, wherein said calculating, based on surveying and mapping data, topographic parameters of a moraine lake and upstream glaciers, calculating a dangerous topography determination factor R of the corresponding moraine lake according to the obtained topographic parameters, and selecting a moraine lake to undertake focal monitoring according to the dangerous topography determination factor R in step S1 comprises:

S11, according to the surveying and mapping data, obtaining a volume $V_L$ of each moraine lake, a height $h_b$, a width $w_b$, and a downstream slope $S_b$ of a dam of the moraine lake, and a volume $V_g$ of dangerous ice and a glacier tongue slope $S_G$ of an upstream glacier tongue of the moraine lake, wherein the surveying and mapping data comprise an optical remote sensing image and a digital elevation model;

S12, based on topographic data obtained in step S11, calculating the topographic parameters, wherein the topographic parameters comprise a height-width ratio $\gamma$ and a downstream slope factor $G_b$ of the dam of the moraine lake, as well as a dangerous ice index I and a glacier tongue slope factor $G_G$ of the upstream glacier tongue;

wherein the height-width ratio of the moraine lake's dam is $\gamma = h_b/w_b$; the downstream slope factor $G_b$ of the dam is obtained by dimensionless processing on the downstream slope $S_b$; the glacier tongue slope factor $G_G$ is obtained by dimensionless processing on the glacier tongue slope $S_G$; and the dangerous ice index $I = V_g/V_L$, wherein $V_g$ denotes the volume of dangerous ice, and $V_L$ denotes the volume of the moraine lake;

S13, calculating, based on the topographic parameters obtained in step S12, the dangerous topography determination factor R:

$$R = k_1 G_G + k_2 I + k_3 G_b + k_4 \gamma$$

wherein $k_1$, $k_2$, $k_3$ and $k_4$ are weight coefficients; and

S14, determining the moraine lake with the dangerous topography determination factor R greater than a predetermined threshold as the moraine lake to undertake focal monitoring.

3. The early warning method for the icefall-caused moraine lake outburst disasters according to claim 2, wherein step S11 comprises performing interpretation based on the optical remote sensing image to calculate an area $A_g$ of dangerous ice in the upstream glacier tongue, and extracting a slope $S_g$ of dangerous ice in the upstream glacier tongue by using the digital elevation model; and calculating, by following formula, the volume $V_g$ of dangerous ice based on the obtained area $A_g$ of dangerous ice and the slope $S_g$ of dangerous ice:

$$V_g = A_g \times \frac{\tau_0}{k\rho g \sin S_g}$$

wherein $\tau_0$ denotes an ice yield stress, k denotes a block calculation coefficient, $\rho$ denotes an ice density, and g denotes a gravitational acceleration.

4. The early warning method for the icefall-caused moraine lake outburst disasters according to claim 2, wherein step S11 further comprises performing interpretation based on the optical remote sensing image to calculate a lake area $A_L$ of the moraine lake; and obtaining a water depth $D_L$ based on an empirical formula regarding a water depth $D_L$ of a region where the moraine lake is located, and the lake area $A_L$; and calculating the volume $V_L$ of the moraine lake according to a following volume formula of the moraine lake:
$$V_L = A_L \times D_L.$$

5. The early warning method for the icefall-caused moraine lake outburst disasters according to claim 2, wherein step S13 comprises calculating the weight coefficients $k_1$, $k_2$, $k_3$ and $k_4$ by using an analytic hierarchy process, which is expressed as follows:

$$k_i = \frac{1}{n} \times \sum_{j=1}^{n} \frac{a_{ij}}{\sum_{q=1}^{m} a_{qj}}$$

wherein $k_i$ denotes a weight coefficient, n denotes a number of rows of a judgment matrix, m denotes a number of columns of the judgment matrix, $a_{ij}$ denotes comparison on importance of an ith influence factor and a jth influence factor, and $a_{qj}$ denotes comparison on the importance of a qth influence factor and the jth influence factor.

6. The early warning method for the icefall-caused moraine lake outburst disasters according to claim 1, wherein
said calculating climate parameters of an upstream glacier region of the moraine lake to undertake focal monitoring in step S2 comprises:
S21, performing regional temperature interpolation on the upstream glacier region;
S22, performing local temperature correction based on regional temperature interpolation and temperature observation data at monitoring sites; and
S23, calculating a freezing-thawing cycle index β and a regional accumulated temperature index α in the upstream glacier region during a time interval from a starting day of an adjacent winter half year to a day on which monitoring is performed.

7. The early warning method for the icefall-caused moraine lake outburst disasters according to claim 6, wherein
said performing regional temperature interpolation on the upstream glacier region in step S21 comprises:
performing, by Thin Plate Spline (TPS), regional temperature interpolation on the upstream glacier region based on daily temperature observation data at a meteorological station of the moraine lake and topographic data of upstream glaciers of the moraine lake:

$T_i f(x_i) + b^T y_i + e_i$ wherein $T_i$ denotes a temperature interpolation result of a grid i in the upstream glacier region, $f(x_i)$ denotes an estimated temperature of a grid $x_i$, b denotes a coefficient of terrain covariate, $y_i$ denotes an elevation value of the grid $x_i$, and $e_i$ denotes a random error.

8. The early warning method for the icefall-caused moraine lake outburst disasters according to claim 6, wherein
said performing local temperature correction based on regional temperature interpolation and temperature observation data at monitoring sites in step S22 comprises:
S221, obtaining daily temperature observation data $t_i$ of each monitoring site by using temperature monitoring equipment installed at each monitoring site in the upstream glacier region, and calculating a difference between the daily temperature observation data and the temperature interpolation result $T_i$ of the grid $x_i$ to which the monitoring site belongs so as to obtain a single-site temperature correction value $R_{Ti}$ of temperature interpolation and observation value;
S222, constructing a Thiessen polygon based on the temperature correction value $R_{Ti}$ of each monitoring site in the upstream glacier region, and performing spatial interpolation to generate local temperature correction data $R_T$; and
S223, calculating local temperature optimization data $T_R$ by adding the regional temperature interpolation result and local temperature correction data $R_T$ with their resolutions being unified.

9. The early warning method for the icefall-caused moraine lake outburst disasters according to claim 1, wherein
said performing determination using a climate determination model oriented towards icefall-caused moraine lake outburst in step S3 comprises:
S31, based on a disaster history sample, calculating a freezing-thawing cycle index β and a regional accumulated temperature index α of a year in which a disaster occurs, and an adjacent year adjacent to the year and without disaster occurrence, wherein the starting day of the winter half year adjacent to a day on which a disaster occurs is deemed as the initial day, a time interval of the adjacent year refers to a period from an initial day of a current calendar year to an initial day of a previous calendar year, and a time interval of the year in which a disaster occurs refers to a period from the initial day to the day on which a disaster occurs;
S32, constructing a two-dimensional space of the freezing-thawing cycle index β and regional accumulated temperature index α, projecting data of the year in which a disaster occurs and the adjacent year adjacent to the year and without disaster occurrence to the two-dimensional space, performing regression analysis and setting a catastrophic climate threshold $T_{y\text{-}threshold}$; and
S33, based on the freezing-thawing cycle index β and the regional accumulated temperature index α obtained in step S2, calculating the catastrophic climate determination factor $T_{G\text{-}year}$; based on the catastrophic climate threshold $T_{y\text{-}threshold}$ obtained in step S32, determining a relationship between the catastrophic climate determination factor $T_{G\text{-}year}$ and the catastrophic climate threshold $T_{y\text{-}threshold}$; and if $T_{G\text{-}year} > T_{y\text{-}threshold}$, determining that climate conditions for icefall-caused moraine lake outburst are met.

10. The early warning method for the icefall-caused moraine lake outburst disasters according to claim 9, wherein
the regression analysis in step S32 is to solve an optimal segmented hyperplane of the two-dimensional space;
in step S33, based on the freezing-thawing cycle index β and the regional accumulated temperature index α in the upstream glacier region, the catastrophic climate determination factor $T_{G\text{-}year}$ is calculated according to the following formula:

$T_{G\text{-}year} = k_5 \beta + k_6 \alpha$ wherein $k_5$ and $k_6$ denote fitting coefficients of an optimal segmentation curve in the two-dimensional space constructed by the freezing-thawing cycle index β and regional accumulated temperature index α; and the catastrophic climate threshold $T_{y\text{-}threshold}$ is set as follows according to a maximum geometric margin of the two-dimensional space:

$$T_{y\text{-}threshold} = -\frac{b}{w}$$

wherein w and b are parameters of a minimum vector distance segmentation surface between samples with disaster occurrence and samples without disaster occurrence in the two-dimensional space.

11. The early warning method for icefall-caused moraine lake outburst disasters according to claim 1, wherein said implementing early warning in step S4 comprises:

S41, based on historical sample databases with or without disaster occurrence, calculating a dangerous topography determination factor R and a catastrophic climate determination factor $T_{G\text{-}year}$ of each sample, and projecting data of all samples to the two-dimensional space for regression analysis;

S42, based on the dangerous topography determination factor R obtained in step Si and the catastrophic climate determination factor $T_{G\text{-}year}$ obtained in step S3 for a target moraine lake, determining a probability that a disaster occurs in the target moraine lake according to an analysis result obtained in step S41, and establishing early warning levels according to the disaster probability; and S43, implementing early warning corresponding to one of the early warning levels of the target moraine lake.

12. The early warning method for icefall-caused moraine lake outburst disasters according to claim 11, wherein regarding the historical sample database with disaster occurrence, samples are acquired from data of a moraine lake where a disaster has occurred, and a time interval of the sample data is from a day on which a disaster occurs to the starting day of the winter half year adjacent to the day on which a disaster occurs; and regarding the historical sample database without disaster occurrence, samples are acquired from data of adjacent year without disaster occurrence in the moraine lake where a disaster has occurred in history and the data of adjacent and disaster-free moraine lakes within the same period; wherein the time interval of the adjacent year is a period from the initial day of the current calendar year to the initial day of the previous calendar year, and the initial day is the starting day of the winter half year adjacent to the day on which a disaster occurs; and the same period means the time interval from the day on which a disaster occurs to the starting day of the winter half year adjacent to the day on which a disaster occurs.

13. The early warning method for icefall-caused moraine lake outburst disasters according to claim 11, wherein step S41 comprises constructing, according to following formula, an outburst risk probability segmentation index model for regression analysis:

$$CR = T_{G\text{-}year} - \omega \times \ln(R)$$

wherein $T_{G\text{-}year}$ denotes a catastrophic climate determination factor, R denotes a dangerous topography determination factor, and $\omega$ denotes a fitting parameter of an index segmentation curve in a two-dimensional space; and step S42 comprises calculating CR based on the dangerous topography determination factor R obtained in step Si and the catastrophic climate determination factor $T_{G\text{-}year}$ obtained in step S3 for the target moraine lake; and determining early warning level of the target moraine lake according to the range within which CR falls.

14. The early warning method for icefall-caused moraine lake outburst disasters according to claim 13, wherein step S41 comprises:

S411, normalizing a dangerous topography determination factor $R_i$ and a catastrophic climate determination factor $T_{G\text{-}Year_i}$ of each sample, obtaining projection weights $\varphi_i$ and $\gamma_i$ respectively, calculating a sum $(\varphi_i + \gamma_i)$ of the projection weights, and sorting all weight sums by size, wherein i denotes a sample serial number;

S412, performing probabilistic segmentation on sorted weight sums $(\varphi_i + \gamma_i)$ into n probability intervals according to probabilities of disaster occurrence, wherein a segmented probability is denoted as $P_m$, and samples falling in each probability interval constitute a probability interval sample set $S_n$, and the subscripts m and n represent a serial number, with $m \geq 1$ and $n = m+1$; and the probability of disaster occurrence represents a proportion of the number of samples with disaster occurrence to the total number of samples in the probability interval sample set $S_n$;

S413, extracting, from adjacent probability interval sample sets, partial samples with $(\varphi_i + \gamma_i)$ ranking at the bottom in the probability interval sample set with a high probability of disaster occurrence and partial samples with $(\varphi_i + \gamma_i)$ ranking at the top in the probability interval sample set with a low probability of disaster occurrence, to construct a segmented sample dataset $D_m$ of a segmented probability $P_m$ corresponding to the adjacent probability interval sample sets, wherein the partial samples are samples of a specified number or proportion;

S414, based on the segmented sample dataset $D_m$, calculating corresponding optimal segmentation $CR_m$ and $\omega_m$ by following objective function:

$$\min_{CR,\omega} \sum_{i=1}^{N} (y_i - (CR + \omega^T X))^2$$

wherein $y_i$ denotes $T_{G\text{-}year_i}$ of an ith sample in the probability interval sample $D_m$, X denotes an $\ln(R_i)$ matrix of each sample in the probability interval sample $D_m$, and N denotes a number of samples in the probability interval sample $D_m$; and S415, establishing the early warning levels according to calculated $CR_1, CR_2, \ldots, CR_m$, wherein the segmented probability increases as the level increases.

* * * * *